United States Patent
Davidson et al.

(10) Patent No.: US 11,861,514 B2
(45) Date of Patent: Jan. 2, 2024

(54) USING MACHINE LEARNING ALGORITHMS TO PREPARE TRAINING DATASETS

(71) Applicant: Luminex Corporation, Austin, TX (US)

(72) Inventors: Bryan Richard Davidson, Kent, WA (US); Vidya Venkatachalam, Bellevue, WA (US); Artiom Zayats, Seattle, WA (US); Michael C. Riedel, Seattle, WA (US)

(73) Assignee: Luminex Corporation, Austin, TX (US)

( * ) Notice: Subject to any disclaimer, the term of this patent is extended or adjusted under 35 U.S.C. 154(b) by 648 days.

(21) Appl. No.: 17/016,244

(22) Filed: Sep. 9, 2020

(65) Prior Publication Data

US 2021/0081822 A1    Mar. 18, 2021

Related U.S. Application Data

(60) Provisional application No. 62/902,344, filed on Sep. 18, 2019.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ............ G06N 5/04; G06N 20/00; G06N 3/08; G06N 3/0454; G06K 9/6267; G06K 9/6256; G06K 9/6263; G06T 2207/20081; G06V 10/774; G06V 10/764
See application file for complete search history.

(56) References Cited

U.S. PATENT DOCUMENTS

| | | | |
|---|---|---|---|
| 9,704,054 B1 * | 7/2017 | Tappen | G06V 10/764 |
| 9,990,687 B1 * | 6/2018 | Kaufhold | G06K 9/6256 |
| 10,380,260 B2 | 8/2019 | Hewitt | |

(Continued)

FOREIGN PATENT DOCUMENTS

| | | |
|---|---|---|
| EP | 4032020 A | 7/2022 |
| JP | 2014-137284 A | 7/2014 |

(Continued)

OTHER PUBLICATIONS

Examination report No. 1 in Australian Appl. No. 2020348209 dated Jan. 30, 2023, 3 pages.
Notice of acceptance in Australian Appl. No. 2020348209 dated Apr. 11, 2023, 3 pages.
International Search Report and Written Opinion in PCT Appl. No. PCT/US2020/049804 dated Feb. 12, 2021, 10 pages.

(Continued)

*Primary Examiner* — Dave Misir
(74) *Attorney, Agent, or Firm* — Kowert, Hood, Munyon, Rankin & Goetzel, P.C.

(57) ABSTRACT

A computer system is configured to receive a dataset of image-derived features for a plurality of images, reduce the dimensionality of this dataset, identify clusters within the dimensionally-reduced dataset, and generate a visual representation of the datapoint of the dimensionally-reduced dataset as icons grouped by cluster. User input is received to apply user classification labels to the images for inclusion in a training dataset. A user interface is useable to present information to the user and receive information from the user to facilitate the application of user classification labels.

18 Claims, 13 Drawing Sheets

(56) References Cited

U.S. PATENT DOCUMENTS

| | | |
|---|---|---|
| 10,489,722 B2 | 11/2019 | Farré et al. |
| 11,238,070 B1* | 2/2022 | Ghadar .................. G06F 16/56 |
| 2006/0062467 A1 | 3/2006 | Zou et al. |
| 2009/0204558 A1 | 8/2009 | Weston et al. |
| 2010/0232675 A1* | 9/2010 | Ortyn ................... G06V 20/695 382/134 |
| 2014/0029839 A1 | 1/2014 | Mensink et al. |
| 2015/0169635 A1 | 6/2015 | Jing et al. |
| 2018/0144270 A1 | 5/2018 | Wilson et al. |
| 2018/0240243 A1* | 8/2018 | Kim ....................... G06N 5/022 |
| 2018/0247227 A1 | 8/2018 | Holtham |
| 2018/0300576 A1* | 10/2018 | Dalyac .................. G06N 20/00 |
| 2019/0014205 A1 | 1/2019 | Miloseski et al. |
| 2019/0034822 A1* | 1/2019 | Farré Guiu .......... G06K 9/6259 |
| 2019/0098724 A1 | 3/2019 | Zhao et al. |
| 2019/0197778 A1* | 6/2019 | Sachdeva ............. G06V 20/588 |
| 2020/0286614 A1* | 9/2020 | Do ........................ G16H 30/40 |
| 2020/0334856 A1* | 10/2020 | Staudinger ............ G06N 3/088 |

FOREIGN PATENT DOCUMENTS

| | | |
|---|---|---|
| JP | 2018-142097 A | 9/2018 |
| WO | 2014/205231 A1 | 12/2014 |

OTHER PUBLICATIONS

Gao et al., "Dimensionality reduction via compressive sensing", 2012, retrieved on [Nov. 13, 2020]. Retrieved from the Internet <URL:http://www.tiberiocaetano.com/papers/2012/GaoShiCae12.pdf> entire document.

Extended European Search Report in EP Appl. No. 20866700.6 dated Dec. 15, 2022, 7 pages.

Office Action in Japanese Appl. No. 2022-517201 dated Apr. 18, 2023, 2 pages.

Office Action in Canadian Appl. No. 3,150,868 dated May 12, 2023, 4 pages.

* cited by examiner

USING MACHINE LEARNING ALGORITHMS TO PREPARE TRAINING DATASETS

CROSS-REFERENCE TO RELATED APPLICATION

This application claims the benefit of U.S. Provisional Application No. 62/902,344 filed on Sep. 18, 2019, which is incorporated by reference herein in its entirety.

BACKGROUND

Technical Field

This disclosure relates generally to the creation of training datasets for training image recognition algorithms.

Description of the Related Art

Image recognition algorithms enable machines to distinguish between different images to and the identity objects represented in the images and, in various instances, to classify the images accordingly. In order for an image recognition algorithm to perform these tasks, however, the algorithm must first be trained with a training dataset. Training datasets include images useable to train the algorithm as well as "truth labels" that indicate what is represented in the images. In various instances, these truth labels are assigned by a human who has reviewed the images in the training dataset.

SUMMARY

The present disclosure concerns the use of machine learning techniques to assist a user in labeling images with classification labels to prepare a training dataset for a target machine learning algorithm. Because the accuracy of the target machine learning algorithm depends in part on the accuracy of the training dataset, preparing a training dataset typically requires that a user review each individual image and apply a classification label. For a training dataset comprised of hundreds or thousands of images, this user review process can be time consuming and expensive, especially when a user with specialized training is needed to review the images. Accordingly, having a computer system facilitate the user review process to make it more accurate and faster can improve the process by which training datasets are made. With machine learning algorithms, the computer system can group images that are likely to have the same classification label and, in embodiments, predict the classification label.

In various embodiments, a computer system uses a first machine learning algorithm to derive features from a plurality of images. Then, the computer system uses a dimensionality reduction algorithm to reduce the dimensionality of a database of these image-derived features. After that, the computer system uses clustering algorithm identifies clusters of datapoints in the dimensionally-reduced dataset. The computer system then generates a visual representation of the datapoints of the dimensionally-reduced dataset and causes the display of one or more of the images for the user. The computer system receives user input applying user classification labels to the images.

The present disclosure also concerns a user interface operable to present information to a user and to receive input from the user to apply classification labels for images to be included in a training dataset for a target machine learning algorithm. In various embodiments, the user interface includes a two or three-dimensional representation of dimensionally-reduced dataset of image data that was derived from a plurality of images and one or more of the plurality of images. The user interface is useable to receive user input to apply user classification labels to the images to prepare a labeled training dataset for training a target machine learning algorithm to classify image.

Figure 1:
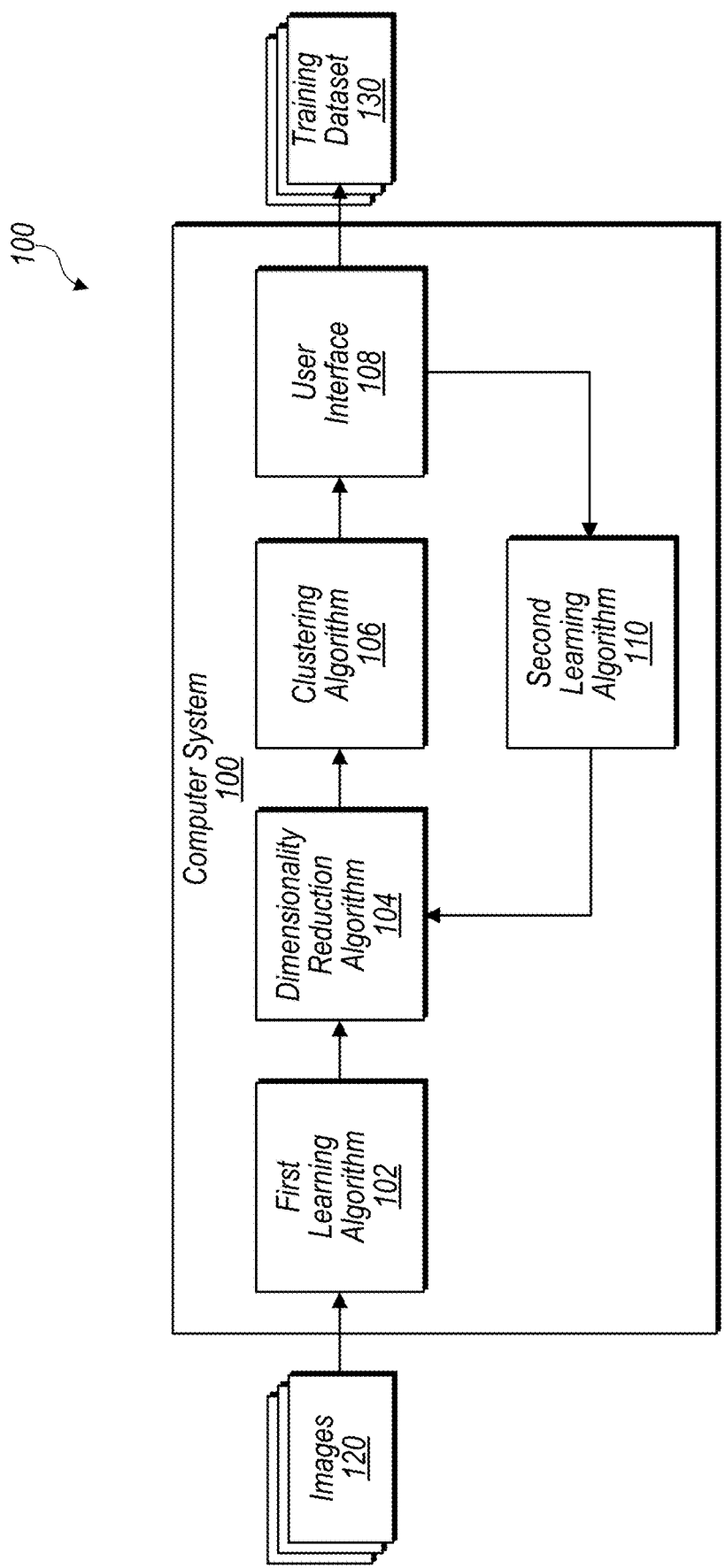
FIG. 1 is a block diagram illustrating an embodiment of a computer system configured to prepare a training dataset using a plurality of images.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to generate a dataset" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" machine learning algorithms would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram of an exemplary embodiment of a computer system 100 is depicted. In various embodiments, computer system 100 receives a plurality of images 120 and prepares a training dataset 130 using the plurality of images 120 and user input. In various embodiments, computer system 100 employs a first machine learning algorithm 102, a dimensionality reduction algorithm 103, a clustering algorithm 106, a second machine learning algorithm 110, and a user interface 108 to prepare training dataset 130 using images 120.

In various embodiments, computer system 100 is any of a number of computing systems configured to receive images 120, receive user input, and prepare training dataset 130. In various embodiments, computer system 100 is implemented with a single computing system (e.g., a single server, desktop computer, laptop computer, tablet computer, smart phone) but in other embodiments is implemented with a plurality of computers working together (e.g., a cloud of servers). In various embodiments, a first portion of computer system 100 (e.g., a server or cloud of servers) is configured to perform the various algorithms and a second portion of computer system 100 (e.g., a laptop computer, a tablet computer) is configured to implement user interface 108 to present information to the user and to receive information from the user.

In various embodiments, the plurality of images 120 can be any of a group of images that, with metadata such as a user classification label, are useable to be included in a training dataset 130. In various embodiments, for example, images 120 include images of cells or other biological specimens. In various embodiments, these images of cells include a plurality of multispectral images of cells, a plurality of multimodal images of the cells, or both. Such images, for example, may have been created using fluorescence imagery in which a specimen is dyed with fluorescent dye and excited with a light source. The disclosed techniques, however, are not merely limited to images of cells and can be used on any type of images that can be included in a training dataset 130 (e.g., picture of plants, picture of animals, pictures of taken from a vehicle traveling on a street of the surroundings, image of human faces, etc.) In various embodiments, the number of images 120 can vary depending on criteria for the target machine learning algorithm, the amount of acceptable training time for target machine learning algorithm, and the desired amount of precision in target machine learning algorithm. For example, a larger set of images 120 can be turned into a larger training dataset 130. The amount of time needed to train the target machine learning algorithm increases as the size of the training dataset 130 increase, but in various embodiments the precision of the target machine learning algorithm may also increase. In various embodiments, the plurality of images 120 includes between 500 and 3000 images 120. In various embodiments, images 120 are randomly selected from a larger pool of images.

In various embodiments, training dataset 130 is useable for training a target machine learning algorithm to classify other images (i.e., images other than images 120). In such embodiments, training dataset 130 includes some or all of images 120 and the user classification labels applied to these images 120 as discussed herein. As used herein, "target machine learning algorithm" includes any image recognition algorithm that, when trained with a training dataset 130, is useable to classify images. For example, in the embodiments discussed herein in connection to FIGS. 5A-5F, training dataset 130 include images of cells with a user classification label identifying the number of nuclei in each image (e.g., one, two, or three or more). After being trained with training dataset 130, the target machine learning algorithm is operable to determine whether other images include one, two, or three or more nuclei.

In various embodiments, first machine learning algorithm 102 is any of a number of algorithms executable to analyze images (e.g., by analyzing pixels of the image) and derive features from these images 120 to generate a dataset of image-derived features. In various embodiments, first machine learning algorithm 102 is a convolutional neural network (CNN). In some of such embodiments, first machine learning algorithm 102 is the Inception V3 Convolutional Neural Network, which has been trained on a large database of images from ImageNet. In embodiments where first leaning algorithm 102 is a CNN, the image-derived features for an image are "bottleneck features" that can be used to describe the contents of the image and to differentiate between different images 120. In various instances, there may be thousands of bottleneck features per image. The output of the first machine learning algorithm 102 includes a multi-dimensional dataset (e.g., one dimension per feature of the image 120) in various embodiments.

For example, after analyzing images 120, first machine learning algorithm 102 generates a dataset of 2048 features per channel of images 120. In various instances, the plurality of images 120 includes between one to twelve channels of images.

In various embodiments, dimensionality reduction algorithm 104 is any of a number of algorithms executable to reduce the dimensionality of the multi-dimensional dataset output by first machine learning algorithm 102 to a dimensionally-reduced dataset by reducing the number of random variables under consideration by obtaining a set of principal variables. In various embodiments, dimensionality reduction algorithm 104 reduces the dimensionality by several orders of magnitude. For example, in some embodiments first machine learning algorithm 102 outputs 2048 features for each image 120, and dimensionality reduction algorithm 104 reduces the dimensionality of this dataset to three or fewer dimensions. In various embodiments, dimensionality reduction algorithm 104 can be one or more of principal component analysis (PCA), uniform manifold approximation and projection (UMAP), or t-distributed stochastic neighbor embedding (t-SNE).

In various embodiments, dimensionality reduction algorithm 104 is also executable to take input from second machine learning algorithm 110. As discussed herein, second machine learning algorithm 110 is executable to output predicted classification labels for unlabeled images 120 based on user classification labels received via user interface 108. Dimensionality reduction algorithm 104 is executable, for each unlabeled image 102, to take these predicted classification labels into account along with the multi-dimensional dataset output by first machine learning algorithm 102 to generate another reduced-dimension dataset having, for example, three or fewer dimensions.

In various embodiments, dimensionality reduction algorithm 104 is executable to output this reduced-dimension dataset to clustering algorithm 106. In such embodiments, clustering algorithm 106 is executable to determine clusters of datapoints within the reduced-dimension dataset. Clustering algorithm 106 may be any of a number of suitable clustering algorithms including but not limited to k-means clustering or spectral clustering algorithms. In various embodiments, the number of clusters is set by the user, and the various datapoints in the reduced-dimension dataset is grouped into the nearest cluster. In various embodiments, the plurality of clusters is equal to X times Y clusters, where X is the number of groups into which a user wants to classify the images (e.g., the number of potential user classification labels) and Y is greater than or equal to 1. In various embodiments, Y is equal to five, for example, although other numbers can be used. In various embodiments during the second or later iteration (i.e., the user has input user classification labels and second machine learning algorithm 110 and dimensionality reduction algorithm 104 have output a dimensionally-reduced dataset with predicted classification labels) clustering algorithm 106 clusters datapoints corresponding to unlabeled images to the nearest classification label. This clustering is presented to the user as predicted classification labels via user interface 108.

In various embodiments, user interface 108 is executable to present information to the user and receive input from the user such that the user can prepare training dataset 130 using images 120. In various embodiments, user interface 108 is a graphical user interface (GUI) that is executable to present a visual representation (e.g., visual representation 400 discussed herein in reference to FIG. 4) of the datapoints in the reduced-dimension dataset as icons grouped by cluster in which each icon represents one or more particular datapoints. In various embodiments, various portions of user interface 108 are selectable to cause the display of the one or more images 120 associated with the one or more particular datapoints such as the icons themselves, a list of the clusters in the dataset, a list of user classification labels, a list of predicted classification labels, or a combination. User interface 108 is also executable to receive user input of a user classification label for various ones of the images 120. User interface 108 is discussed in further detail herein in reference to FIGS. 4 and 5A-5F.

In various embodiments, second machine learning algorithm 110 is executable to predict classification labels for unlabeled images 120 based on user classification labels input by the user for other images 120. In various embodiments, second machine learning algorithm 110 is an iterative optimization algorithm. In various embodiments, second machine learning algorithm 110 can be any suitable supervised learning algorithm including but not limited to a stochastic gradient descent (SGD) model with logarithmic loss or Random Forest model. As discussed herein, in various embodiments second learning algorithm 110 is executable to output to dimensionality reduction algorithm 104. In turn, clustering algorithm 106 clusters the datapoints for the unlabeled images 120 into the nearest classification label. In such embodiments, the results of this clustering are presented to the user using user interface 108 as predicted classification labels. In various instances, the user responds to the predicted classification labels by accepting them as user classification labels or rejecting them and either selecting a different user classification label, marking the classification label for the image 120 as unknown (e.g., leaving it to a second user to review), or excluding the image 120 from training dataset 130 altogether. In various embodiments, the loop illustrated in FIG. 1 from dimensionality reduction algorithm 104 to clustering algorithm 106 to user interface 108 to second machine learning algorithm 110 to dimensionality reduction algorithm 104 iterates until all of images 120 have been labeled or excluded. The processes of labeling images 120 is discussed in further detail in reference to FIGS. 3, 6, and 7 herein.

In various embodiments, the techniques disclosed herein enable a user to more quickly and accurately prepare a training dataset 130 from a plurality of unlabeled images 120. Rather than the user having to look at each image 120 in isolation and assign a user classification label to that image 120 for inclusion in the training dataset 130, instead the various algorithms employed by computer system 100 provide the user with various aids in decision making to make the labeling process more efficient. This is especially important in instances where the decision of which label to apply to a particular image 120 is reviewed by an individual with particular training (for example, a microbiologist or radiologist) and whose labor time is expensive.

In various embodiments discussed herein, first machine learning algorithm 102, dimensionality reduction algorithm 104, and clustering algorithm 106 use machine-learning techniques to pre-sort images 120 into various clusters that are predicted to share visual characteristics and, in many cases, will be given the same user classification labels. A visual representation of the clustering (e.g., in a visual representation 400 discussed in connection to FIG. 4) as well as the images being labeled are displayed using user interface 108 in various embodiments. As discussed herein, the user is able to review the various clusters and assign user classification labels to multiple images 120 at the same time (e.g., by highlighting multiple images 120 and applying a label to each highlighted image). As discussed herein, this process of clustering uses "unsupervised" (i.e., user input was not used in the initial clustering) training techniques that are then reviewed by a user to prepare labeled material for a training dataset 130.

As discussed herein, after a number of user classification labels have been input, using second learning algorithm 120, computer system 100 is able to take the user's input into account to further streamline the labeling process in various embodiments. As discussed herein, by using second learning algorithm 110 computer system 100 is operable to predict which classification labels might be correct for some (or all) of the images 120 that remain unlabeled. In various embodiments, dimensionality reduction algorithm 104 factors in the output of second learning algorithm 110 into generating a second dimensionally-reduced dataset that is then clustered using clustering algorithm 106. As discussed herein, user interface 108 is updated to show the user the clusters of predicted user classification labels (e.g., in a visual representation 512 discussed in connection to FIGS. 5E and 5F). As discussed herein, the user is able to review the various clusters and assign user classification labels to multiple images 120 at the same time (e.g., by highlighting multiple images 120 and applying a label to each highlighted image). As discussed herein, this process of clustering uses "semi-supervised" (i.e., the previous user input was used in the revised clustering, but the user has not yet reviewed all of the images 120) training techniques that are then reviewed by a user to prepare labeled material for a training dataset 130. Accordingly, in various embodiments, the techniques disclosed herein provide a user who is labeling images 120 for training dataset 130 with a guided path from unsupervised clustering to semi-supervised predictions while providing visualizations and an intuitive user interface to aid in decision making.

Figure 2:
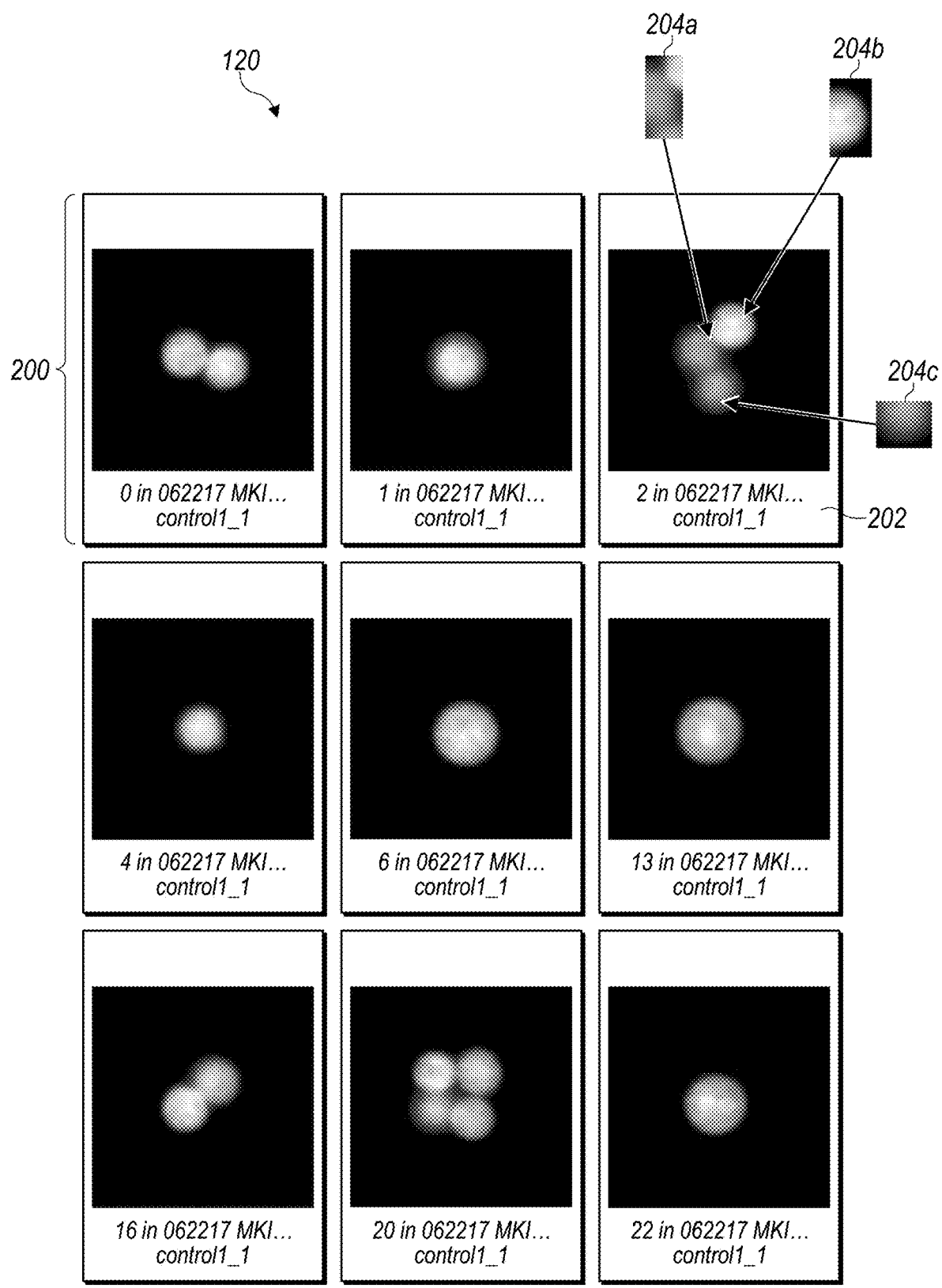
FIG. 2 is sampling of images useable to label and include in a training dataset in accordance with various embodiments.

Referring now to FIG. 2, a sampling of images 120 is depicted. In various embodiments, each image 120 includes a visual portion and metadata 202 (e.g., the name of the particular image 120, when it was created, etc.). As discussed herein in connection to FIGS. 5A-5F, when a particular image 120 is being reviewed and labeled (e.g., using user interface 108) the image is represented using an object 200 in various embodiments. In various embodiments, the object 200 includes metadata 202 about the particular image (such as the name of the image shown in FIG. 2) and is selectable. As discussed herein, selecting object 200 allows the user to apply a user classification label (and/or respond to a predicted classification label) in various embodiments.

FIG. 2 also includes a small number of examples of image-derived features 204. In various embodiments, first machine learning algorithm 102 derives various features from images 120. In various instances, these features are represented by mathematical description of the pixel data of the image 120. Represented visually, however, these image-derived features 204 are portions of the image 120 that collectively describe the image 120 such that it can be differentiated from the other images 120. Accordingly, three image-derived features 204a, 204b, and 204c are shown in FIG. 2, although the number of image-derived features may be much greater than three as discussed above (e.g., thousands of features per image 120 in various embodiments).

Figure 3:
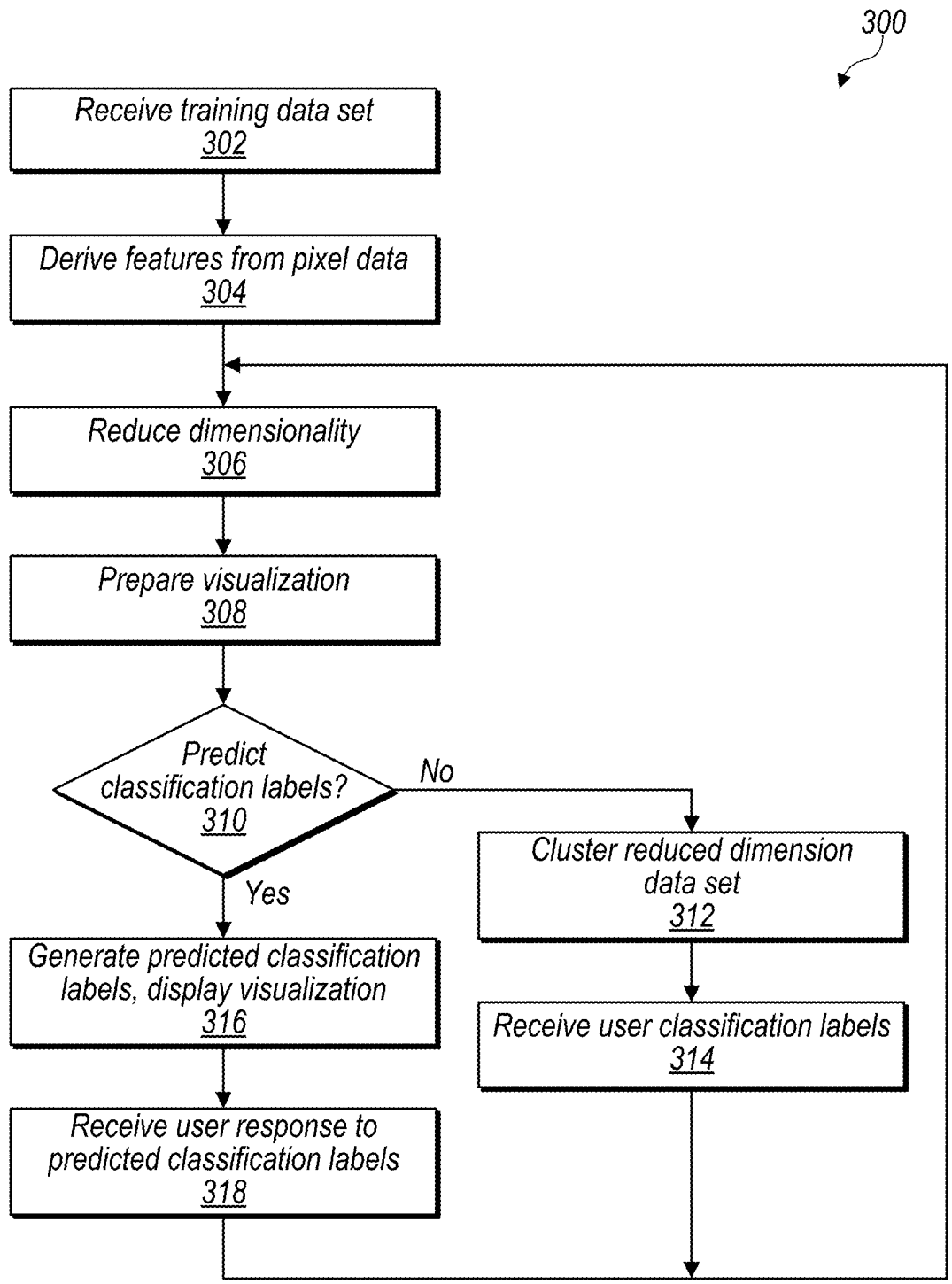
FIG. 3 is flowchart illustrating an embodiment of a training dataset creation method in accordance with various embodiments.

Referring now to FIG. 3, a flowchart illustrating an embodiment of a training dataset creation method 300 is shown. In various embodiments, the various actions associated with method 300 are performed with computer system 100.

At block 302, a user inputs an unlabeled (or insufficiently labeled) training dataset (e.g., a plurality of images 120) for labeling to prepare training dataset 130. As discussed herein, the user may randomly select the images 120 to label from a larger collection of images. The user may input the images 120 by any suitable method including but not limited to inserting storage media (e.g., a disk or hard drive) or downloading the images 120 to computer system 100. In various embodiments in which some of the techniques discussed herein are performed by computer systems 100 implemented on remote clouds of computers, the user may upload the images 120 to the cloud for processing.

At block 304, computer system 100 derives (e.g., with first machine learning algorithm 102) features from the pixel data from the training dataset (e.g., features 204 shown in FIG. 2). At block 306, computer system 100 (e.g., with dimensionality reduction algorithm 104) reduces the dimensionality of the features 204. In various instances, dimensionality reduction is performed on the dataset of derived features 204 prepared by first machine learning algorithm 102 using the plurality of images. In other instances (e.g., when method 300 proceeds to block 306 from block 314), dimensionality reduction is performed on the dataset of derived features 204 while taking into account user classification labels that have been applied to some of the plurality of images 120. In either instance, dimensionality reduction algorithm 104 receives a relatively large dimensional dataset each of the plurality of images 120 (e.g., a dataset of 2048 features of an image 120) and reduces it down to a substantially smaller number of dimensions such as two dimensions in some embodiments or three dimensions in other embodiments.

At block 308, computer system 100 prepares a visual representation 400 (also referred to herein as an "object map") of the datapoints of the dimensionally-reduced dataset. As discussed in further detail in reference to FIG. 4, this visual representation 400 is a two-dimensional plot with icons representing one or more datapoints in the dimensionally-reduced database in various embodiments. In other embodiments, the visual representation 400 is a three-dimensional plot with icons representing one or more datapoints in the dimensionally-reduced database.

At block 310, a determination is made whether to predict classification labels for the plurality of images 120. In various embodiments, computer system 100 is configured to make this determination based on the number of user classification labels that have been input. For example, if the percentage of images 120 that are label below a threshold (e.g., 30%, 40%, or any other threshold) or when no user classifications have been received, the determination is made automatically and method 300 proceeds to block 312. If the percentage is above the threshold, method 300 proceeds to block 310. In various embodiments, the determination is made by a user who determines whether method 300 should proceed to block 312 or block 314, and computer system 100 proceeds according to commands from the user.

At block 312, computer system 100 clusters the dimensionally-reduced dataset (e.g., with clustering algorithm 106) into a predetermined number of clusters in various embodiments. In iterations of method 300 in which no predicted classification labels have been generated, clustering algorithm clusters the datapoints into X times Y clusters, wherein X is the number of groups (e.g., the number of user classification labels) into which a user wants to classify the images; and Y is greater than or equal to 1 (e.g., 3, 4, 5). In various embodiments, these clusters are incorporated in visual representations 400 discussed herein in connection to FIGS. 4 and 5A-5F.

At block 316, having determined to predict classification labels, computer system 100 (e.g., with second learning algorithm 110) predicts classification labels for the unlabeled images in the plurality of images 120. In iterations of method 300 in which classification labels have been predicted, the various datapoints are clustered into clusters for each user classification label. In such embodiments, datapoints representing images 120 that have user classification labels are clustered into the cluster associated with their respective labels and unlabeled datapoints are clustered into the nearest cluster as a predicted classification label. Computer system 100 generates a visual representation 400 incorporating the predicted classification labels. In various embodiments, this updated visual representation 400 appears on a user interface as discussed in further detail in reference to FIGS. 5D, 5E, and 5F.

At blocks 314 and 318, computer system 100 receives user input to apply user classification labels. At block 314, computer system 100 receives user input to apply user classification labels to one or more unlabeled images 120. In various embodiments, this input is received via a menu appearing on a user interface as discussed in further detail in reference to FIG. 5C. Similarly, at block 318 computer system 100 receives user input to apply user classification labels to one or more unlabeled images 120 that have been given predicted classification labels in various embodiments. In various embodiments, this input is received via a menu appearing on user interface 108 as discussed in further detail in reference to FIG. 5F. In various embodiments, such user classification labels include labels for the various images 120 that describe what is contained in the image for use in training the target machine learning algorithm (e.g., as discussed in FIGS. 5A-5F, the image contains one nucleus, two nuclei, or three or more nuclei). In various embodiments, the user classification label can also be a label excluding the image from the training dataset 130. In various embodiments, the user classification label can be that the label is unknown (e.g., the user is unable to identify what label to apply). In various embodiments, images 120 labeled unknown and exclude are not included in training dataset 130. After blocks 314 and 318, if some of the plurality of images 130 remain unlabeled, method 300 loops back to block 306 in various embodiments.

Figure 4:
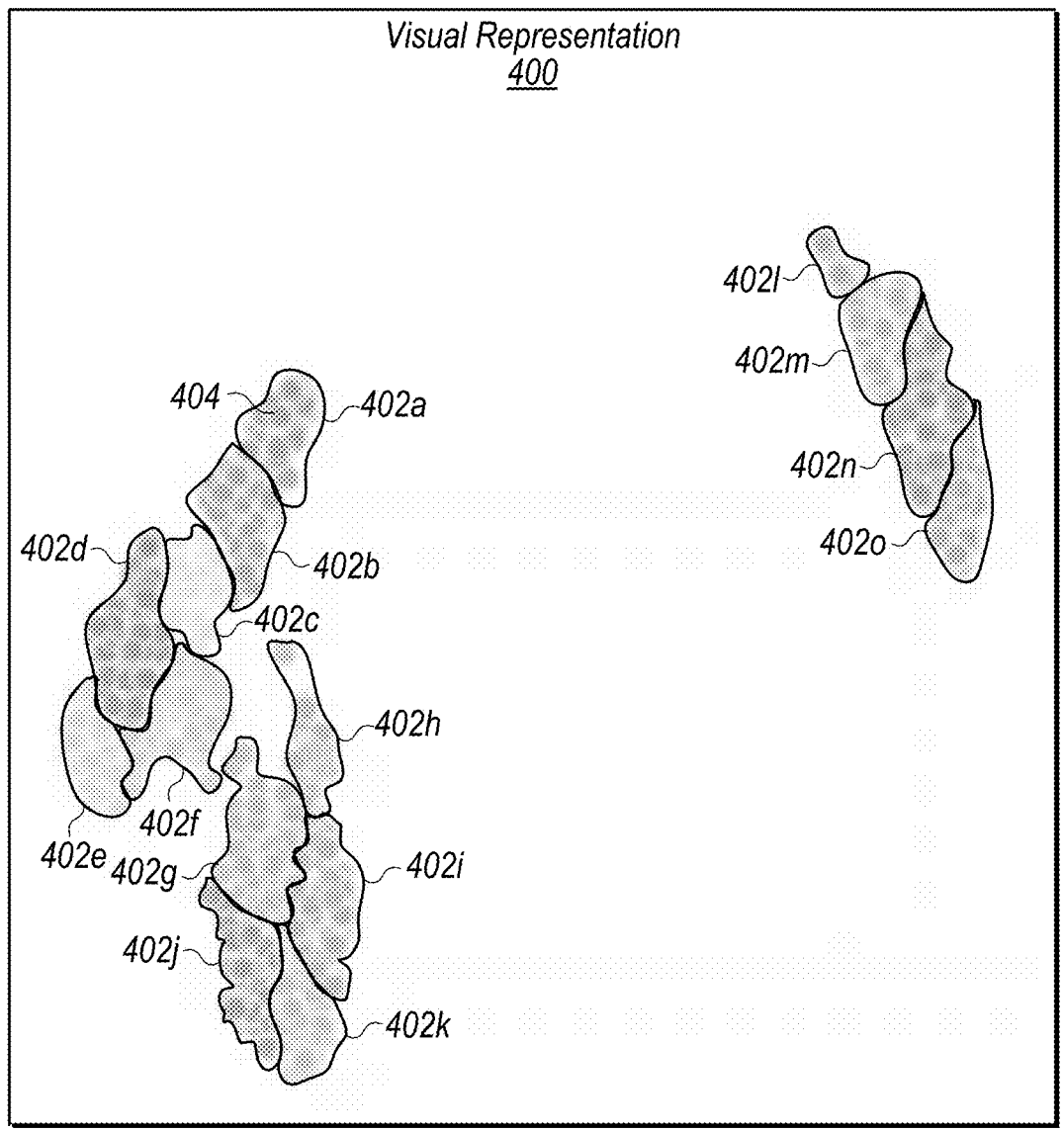
FIG. 4 is an example visual representation of a dimensionally-reduced dataset for a plurality of images.

Referring now to FIG. 4, an example visual representation 400 of a dimensionally-reduced dataset for a plurality of images 120 is depicted. In the embodiment shown in FIG. 4, visual representation 400 is a two-dimensional rendering that includes a plurality of icons 404 that represent datapoints in the dimensionally-reduced dataset output by dimensionality reduction algorithm 104 grouped into clusters 402. In the embodiment shown in FIG. 4, the datapoints in the dimensionally-reduced dataset have been grouped into 15 clusters, 404a-404o. In various embodiments, this clustering is represented in visual representation 400 using one or more techniques including but limited to (a) rendering the visual representation 400 such that icons 404 that correspond to datapoints in the same cluster 402 are positioned closed together, (b) rendering the visual representation 400 such that icons 404 that correspond to datapoints in the same cluster 402 are shaded with a same color (e.g., red for cluster 402a, blue for cluster 402b, green for cluster 402c), (c) rendering the visual representation 400 such that icons 404 that correspond to datapoints in the same cluster 402 are encircled by a polygon, or a combination. In various embodiments, the position of the various icons 404 on the two-dimensional embodiment of visual representation 400 shown in FIG. 4 is based on the two dimensions of the dimensionally-reduced dataset (e.g., the X axis coordinate is based on a first dimension and the Y axis coordinate is based on a second dimension). Similarly, when the dimensionally-reduced dataset has three dimensions, visual representation 400 is a three-dimensional figure with the position of the various icons 404 based on the three dimensions of the dimensionally-reduced dataset (e.g., the X axis coordinate is based on a first dimension and the Y axis coordinate is based on a second dimension, the Z axis coordinate is based on a third dimension). As discussed herein, the number of clusters may vary according to the number of user classification labels and whether predicted classification labels have been generated.

Figure 5A:
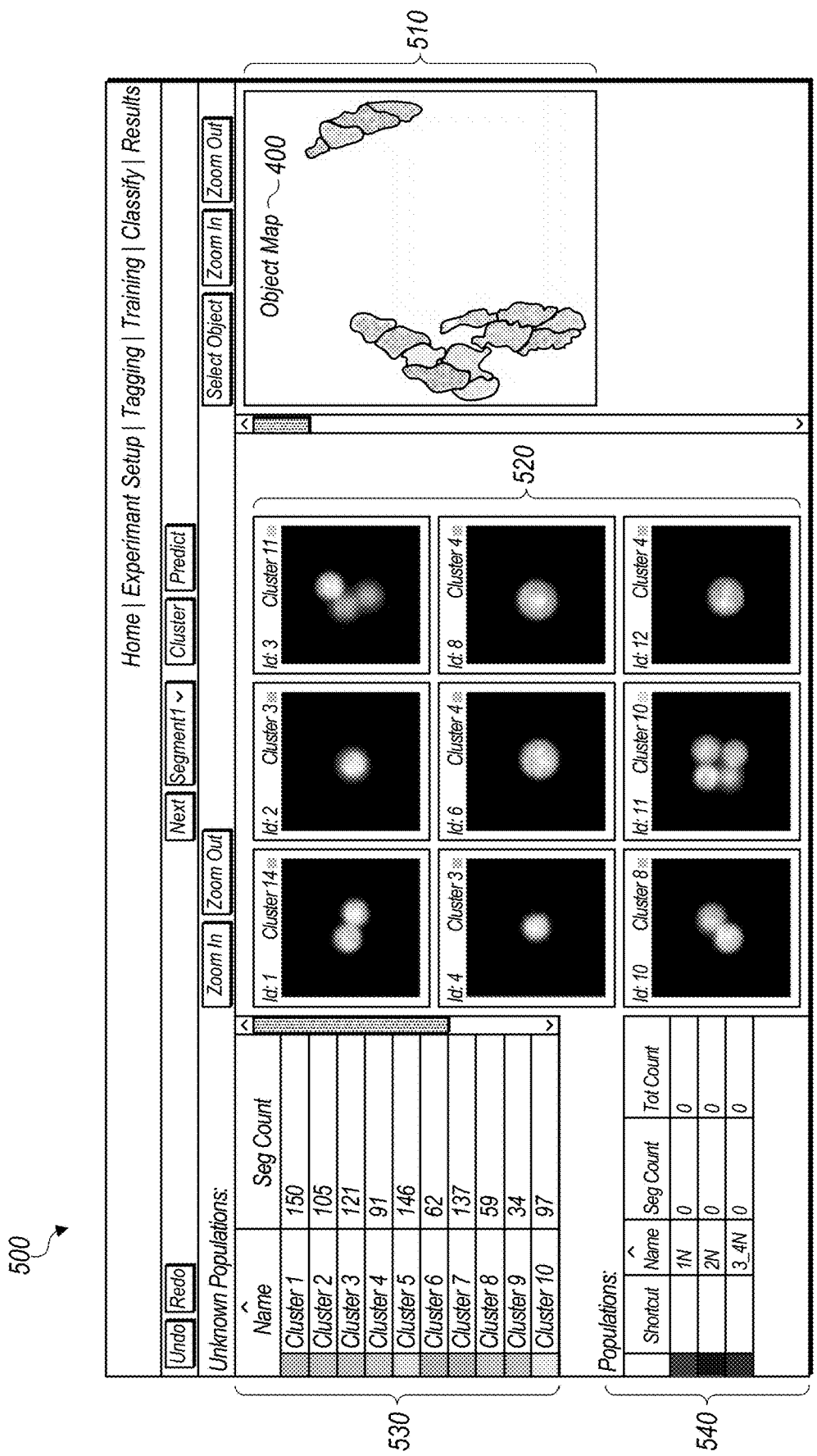
FIGS. 5A-5F are display screens of an exemplary embodiment of a graphical user interface operated by the user interface of FIG. 1 in accordance with the disclosed embodiments.
Figure 5B:
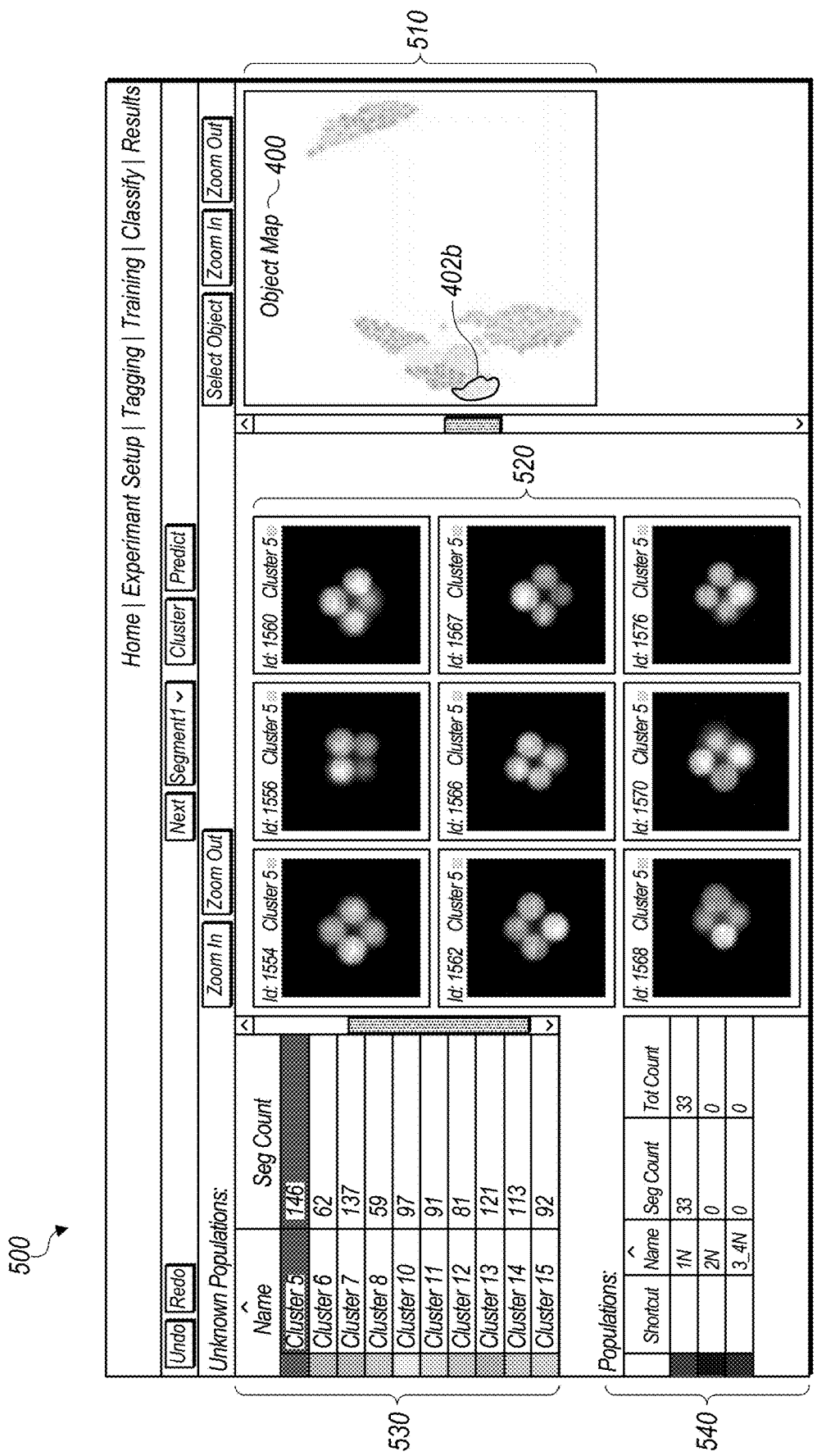
Figure 5C:
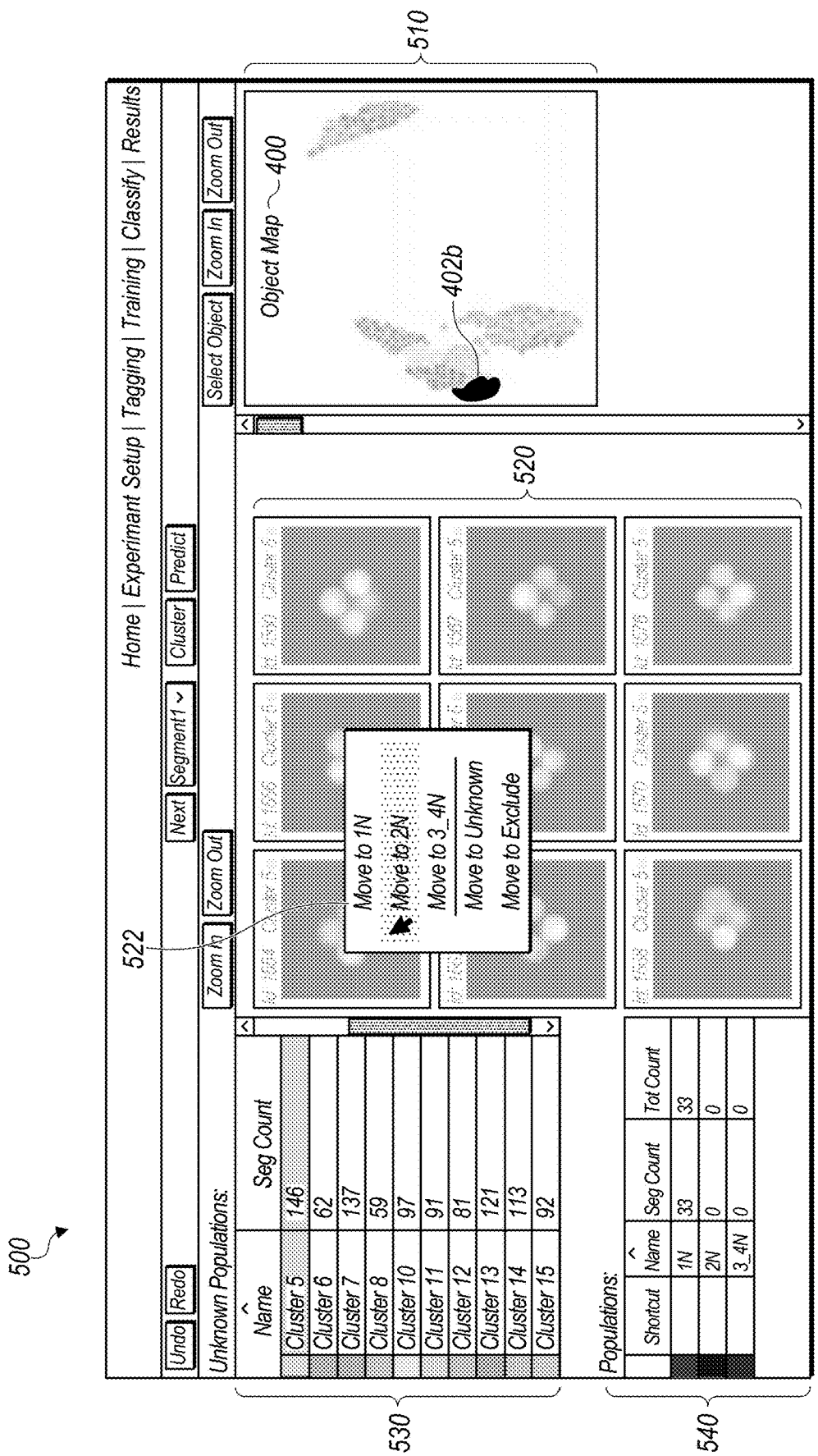
Figure 5D:
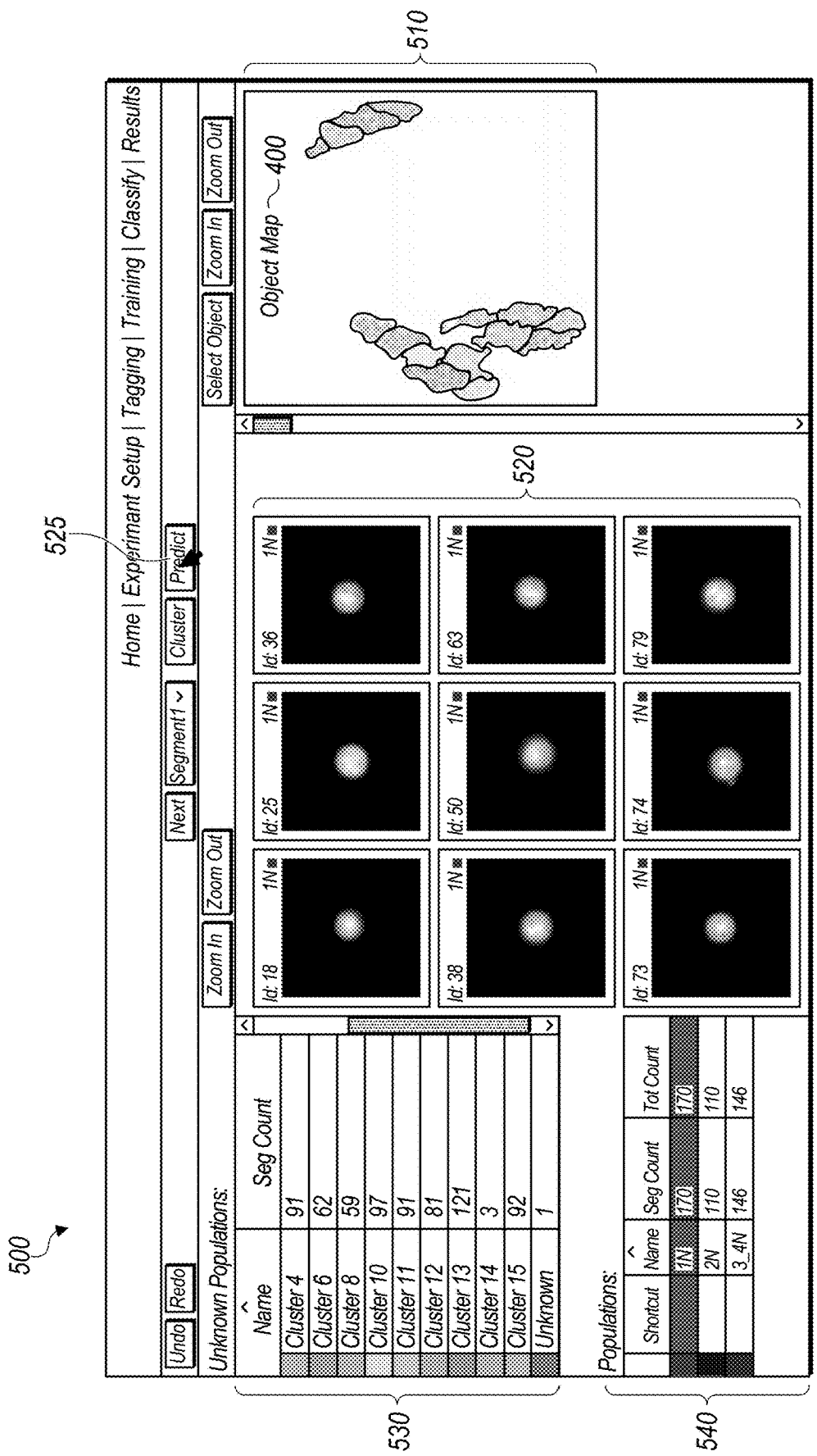
Figure 5E:
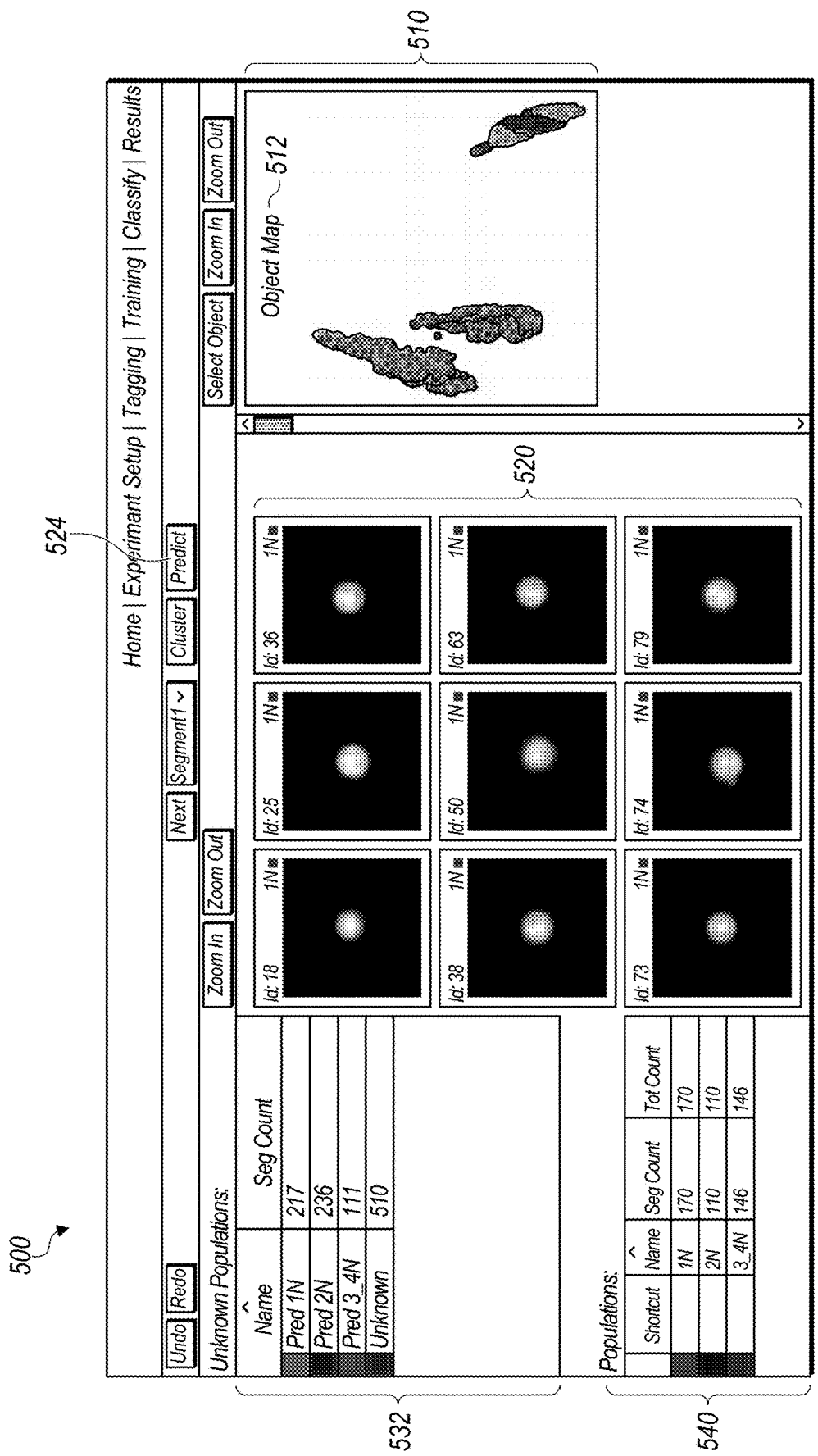
Figure 5F:
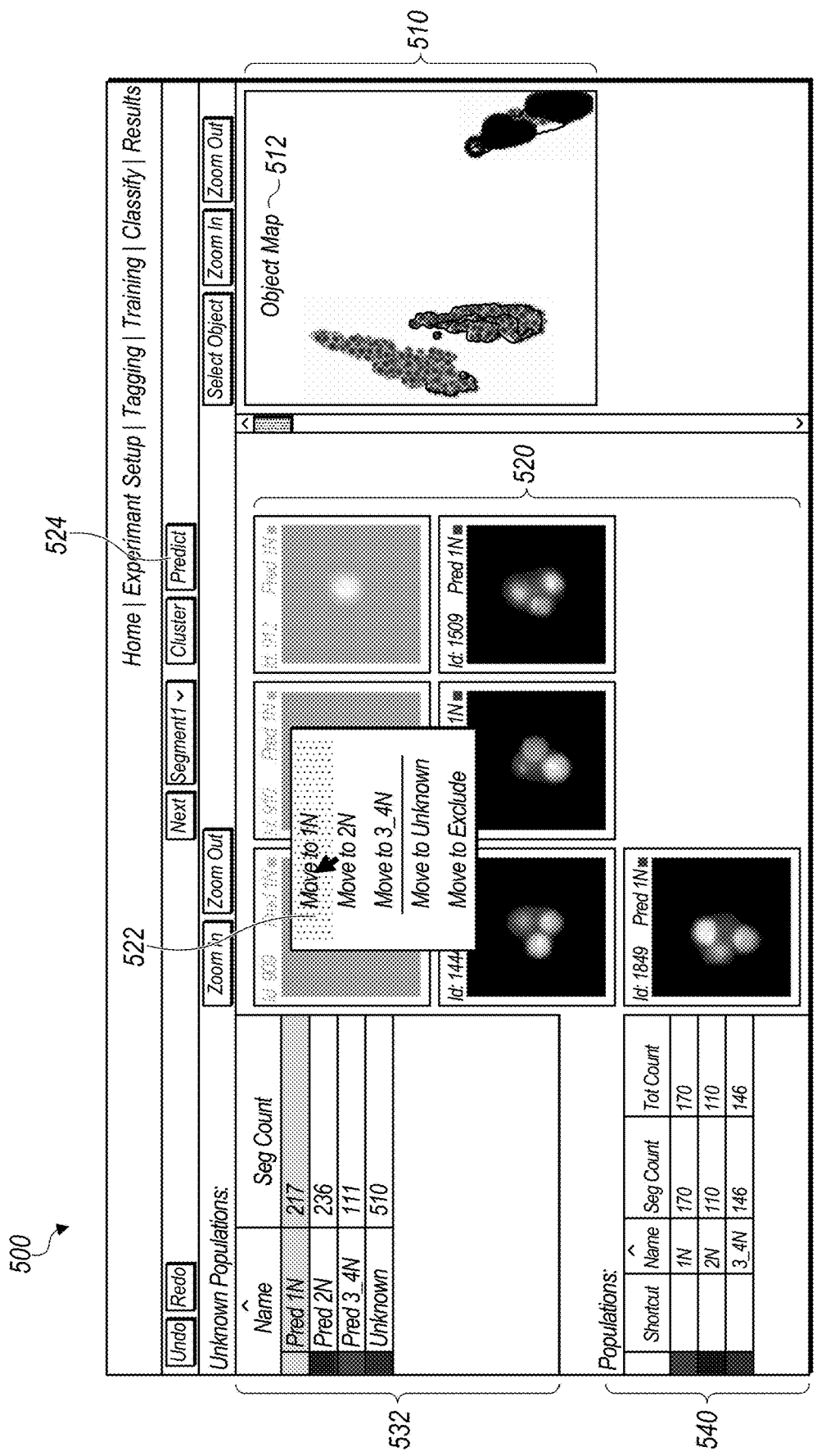

As discussed herein in reference to FIGS. 5E and 5F, an updated visual representation 512 is generated in various instances displaying the dimensionally-reduced dataset output by dimensionality reduction algorithm 104 (this time taking into account the output of second machine learning algorithm 111) grouped into one cluster for each of the user classification labels. In various embodiments, this clustering is represented in visual representation 400 using one or more techniques including but limited to (a) rendering the visual representation 512 such that icons 404 that correspond to datapoints in the same cluster 402 are positioned closer together, (b) rendering the visual representation 512 such that icons that correspond to datapoints in the same cluster 402 are shaded with a same color, (c) rendering the visual representation 512 such that icons 404 that correspond to datapoints in the same cluster 402 are encircled by a polygon, or a combination.

Referring now to FIGS. 5A-5F, various display screens of an exemplary embodiment of a graphical user interface (GUI) 500 operated by user interfaced 108 in accordance with the disclosed embodiments are illustrated. In various embodiments, GUI 500 is displayed on a display screen (e.g., a monitor, a laptop computer display, a tablet computer display) coupled to computer system 100 directly (e.g., via an HDMI cable) or indirectly (e.g., streamed to the display screen over a WAN and/or LAN). As discussed herein, GUI 500 is useable to present information to a user and receive input from the user (e.g., input classifying images 130) to prepare labeled training dataset 130 for training a target machine learning algorithm.

In each screen of GUI 500, a plurality of regions is used to display various information discussed herein. In various embodiments, each screen includes a first region 510 including a two-dimensional visual representation 400 (or an updated visual representation 512). As discussed herein, visual representation 400 represents a dimensionally-reduced dataset of image data that was derived from a plurality of images. In various embodiments, two-dimensional visual representation 400 includes a plurality of icons 404 and indications of clusters 402 within the dataset. In various embodiments, each screen also includes a second region including one or more of the plurality of images 130. In various embodiments, the various screens include a third region 530 to display a list of the identified clusters (and in embodiments the number of images 130 grouped into each). In various other embodiments, the various screens include an updated third region 532 to display a list of the predicted classification labels (and in embodiments the number of images 130 grouped into each). In various embodiments, the various screens include a fourth region 540 to display a list of the user classification labels (and in embodiments the number of images 130 labeled with each). In FIGS. 5A-5F, first region 510 is disposed on the right side of GUI 500, second region 520 is disposed in the middle of GUI 500, and third region 530 (and updated third region 532) and fourth region 540 are disposed on the left side of GUI 500, but these various regions can be arranged in any order. The various regions in FIGS. 5A-5F are depicted as being part of the same window, but in other embodiments some or all of the regions may be presented as separate windows. Referring again to FIG. 3, the actions of blocks 302-312 are performed prior to the display the screen depicted in FIG. 5A, the actions of block 314 are performed during the display of the screen depicted in FIG. 5C, the decision at block 310 is made during the display of the screen depicted in FIG. 5D, the actions of block 316 are performed prior to the display of the screen depicted in FIG. 5E, and the actions of block 316 are performed during the display of the screen depicted in FIG. 5F.

In various embodiments, first region 510 is useable to display visual representation 400 discussed herein in reference to FIG. 4 or updated visual representation 512 discussed herein in reference to FIGS. 5E and 5F. In various embodiments, each icon 404 of visual representation 400 (or updated visual representation 512) represents one or more datapoint in the dimensionally-reduced dataset. Further, in such embodiments each icon 404 represents one or more of the plurality of images 120 and is selectable to cause the represented images 120 to be displayed in second region 520.

In various embodiments, second region 520 is useable to display one or more images 120. In various embodiments, the images 120 displayed in second region 520 are displayed in response to use selection of portions of first region 5120 (e.g., one or more icons 404 causing images 120 represented by the icons 404 to be displayed), portions of third region 530 or updated third region 532 (e.g., a portion of a list corresponding to a particular cluster causing images 120 associated with that cluster to be displayed), and/or portions of fourth region 540 (e.g., a portion of a list corresponding to the user classification labels causing images 120 labeled with a particular user classification label to be displayed). Each image 120 displayed in second region 520 is displayed as an object 200 in various embodiments. As discussed herein in reference to FIG. 2, each object is associated with metadata for the image 120 and is selectable. Selecting the image, for example, allows the user to apply a user classification label or to respond to a predicted classification label for the selected image 120 as discussed herein.

In various embodiments, third region 530 is useable to display a list of the clusters within the dataset. Similarly, updated third regions 532 (also referred to herein as a "fifth region") is useable to display a list of the predicted classification labels by which the remaining unlabeled images 120 are clustered. In either case, each entry of the list is selectable to cause the images 120 associated with that cluster to be displayed in second region 520 in various embodiments. In various embodiments, the lists displayed in third region 530 and updated third region 532 include respective indication of the number of images 120 associated with each cluster.

In various embodiments, fourth region 540 is useable to display a list of the user classification labels applied to images 120. In some of such embodiments, each entry of the list is selectable to cause the images 120 labeled with the user classification label to be displayed in second region 520. In various embodiments, the list displayed in fourth region 540 includes respective indication of the number of images 120 labeled with each user classification label.

Referring now to FIG. 5A, a first screen of GUI 500 is shown. Prior to the display of this first screen, images 120 have been received by computer system, first machine learning algorithm 102 derived features from the images 120, the dimensionality of the dataset of the derived features have been reduced by dimensionality reduction algorithm 104, and clusters have been determined by clustering algorithm 106. A visual representation 400 of the dimensionally-reduced dataset is displayed in first region 510. A number of images 120 are displayed in second region 520, however because no user selection have been received, the images 120 displayed are not associated with a particular cluster (e.g., they may be display randomly, they may be displayed in chronological order of when they were captured, they may be displayed in alphabetical order by name). A list of the clusters is displayed in third region 530 with indications of the number of images 120 associated with each cluster. Finally, a list of the three user classification labels used in this instance is displayed in fourth region 540. In the examples shown in FIGS. 5A-5F, the user classification labels are determined based on the number of cell nuclei present in each image 120: 1N for images 120 including one nucleus, 2N for images 120 including two nuclei, and 3_4N for image 120 including three or more nuclei. As discussed herein, more than three user classification labels may be used, and the criteria for determining which label should be applied to a particular image 120 also varies in various instances.

Referring now to FIG. 5B, a user selection of one or more icons 404 in cluster 402b has been received. In response, images 120 associated with cluster 402b are displayed in second region 520 and the portion of the list in third region 530 associated with cluster 402b is highlighted.

Referring now to FIG. 5C, in various embodiments, user classification labels are received from the user via a menu 522 displayed in the GUI 500. In various embodiments, menu 522 includes indications of each user classification label, which includes the various labels for training dataset 130 as well as additional labels such as a label to exclude one or more images 120 from training dataset 130. In the example shown in FIG. 5C, menu 522 includes indications of the three user classification labels 1N, 2N, and 3_4N as well as commands to "Move to Unknown" and "Move to Exclude" to mark the selected images 120 accordingly. As shown in FIG. 5C, a number of images 120 are highlighted in second region 520, and the user input to menu 522 will apply the user classification label or command to the highlighted images 120.

Referring now to FIG. 5D, user input applying user classification labels to various images 120 has been received. As shown in fourth region 540, 170 images have been labeled 1N, 110 images have been labeled 2N, and 146 images 120 have been labeled 3_4N. In the embodiment shown in FIG. 5D, the user can enter a command to predict classification labels be clicking on button 524. In response to this command, predicted classification labels are assigned as discussed in block 316 of method 300. Alternatively, a prediction of classification labels is made automatically after a threshold number of images 120 have been labeled.

Referring now to FIG. 5E, GUI 500 now includes updated visual representation 512 and updated third region 532. As discussed herein, the remaining unlabeled images 120 have been assigned predicted classification labels and are clustered by predicted classification labels. Accordingly, visual representation 512 includes four clusters: one associated with each user classification label and one for images for which a classification label has not (or for whatever reason cannot) been determined. Updated third region 532 includes a list of the predicted classification labels: Pred 1N, Pred 2N, Pred 3_4N and Unknown as well as indications of the number of images 120 in with each predicted label. In various embodiments, updated visual representation 512 also includes datapoint associated with the image 120 that have user classification labels. The icons 404 representing these labeled images 120 may be visually different from icons 404 representing unlabeled images including but not limited to being a different color (e.g., icons 404 representing labeled images 120 are a darker color than icons 404 representing unlabeled images 120 but are in the same color family such as dark green and light green or dark blue and light blue) or by being different shapes (e.g., circular icons 404 for unlabeled images and star-shaped icons for labeled images 120). As with visual representation 400 discussed herein, the icons 404 of updated visual representation 512 a selected able to cause the display of the image 120 represented by the selected icon(s) 404. In the screen shown in FIG. 5E, the Pred 1N cluster is selected. In response to this selection, images 120 in the Pred 1N cluster are displayed in second region 520.

Referring now to FIG. 5F, in various embodiments, the user responds to the predicted classification labels by commands that are received from the user via a menu 522 displayed in the GUI 500. In various embodiments, the menu 522 allows a user to accept the predicted classification label as a user classification label by selecting the indication of the user classification label corresponding to the predicted classification label in menu 522 or to reject the predicted classification label by selecting a different indication in menu 522. In various embodiments, menu 522 includes indications of each user classification label, which includes the various labels for training dataset 130 as well as additional labels such as a label to exclude one or more images 120 from training dataset 130. In the example shown in FIG. 5F, menu 522 includes indications of the three user classification labels 1N, 2N, and 3_4N as well as commands to "Move to Unknown" and "Move to Exclude" to mark the selected images 120 accordingly. As shown in FIG. 5F, a number of images 120 are highlighted in second region 520, and the user input to menu 522 will apply the user classification label or command to the highlighted images 120.

Figure 6:
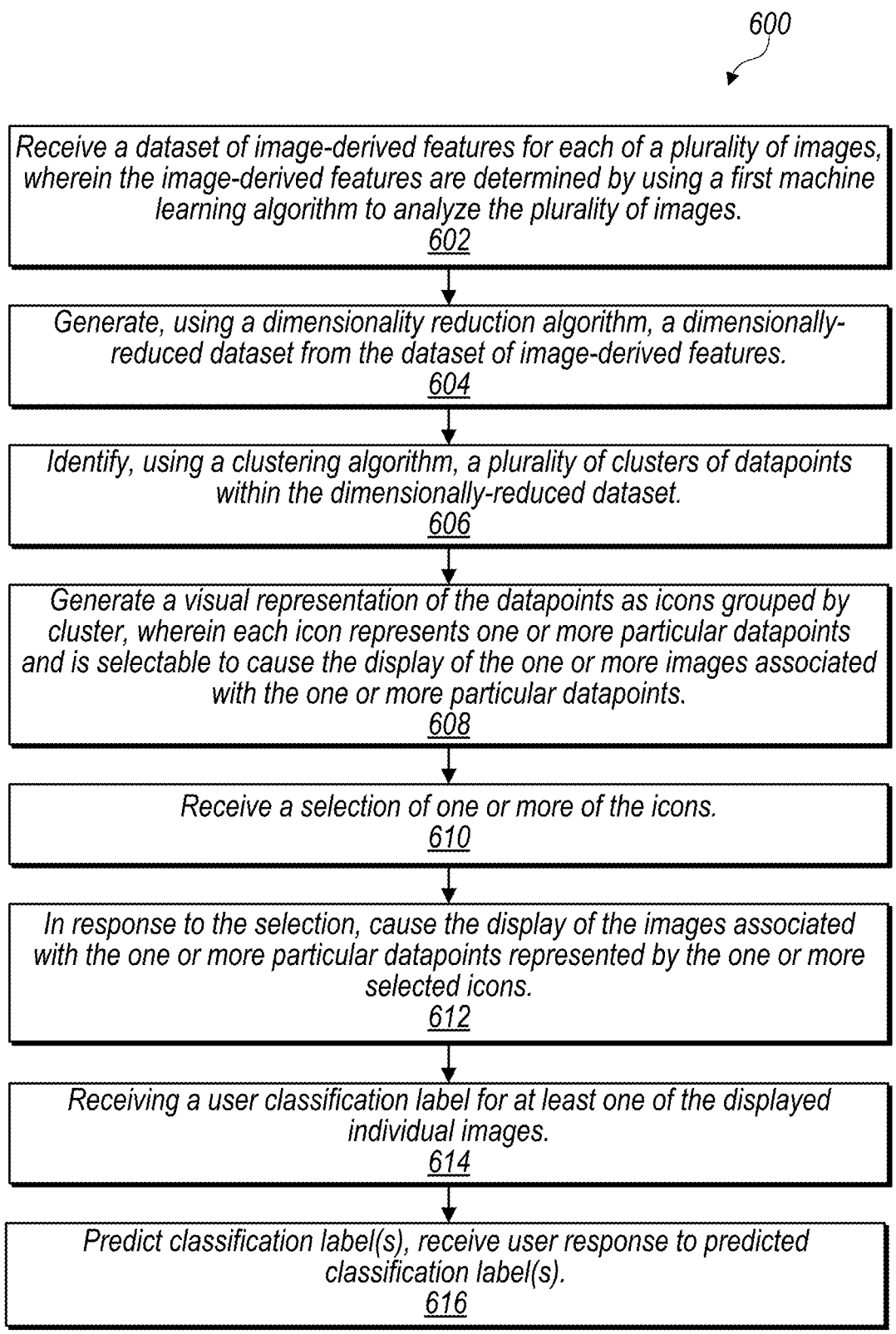
FIG. 6 is flowchart illustrating an embodiment of a training dataset creation method in accordance with various embodiments.

Referring now to FIG. 6, a flowchart illustrating an embodiment of a training dataset creation method 600 is shown. In various embodiments, the various actions associated with method 600 are performed with computer system 100. At block 602, computer system 100 receives a dataset of image-derived features for each of a plurality of images 120, wherein the image-derived features are determined by using a first machine learning algorithm 102 to analyze the plurality of images 120. At block 604, computer system 100 generates a dimensionally-reduced dataset from the dataset of image-derived features using a dimensionality reduction algorithm 106. At block 606, computer system identifies a plurality of clusters of datapoints within the dimensionally-reduced dataset using a clustering algorithm 106. At block 608, computer system 100 generates a visual representation 400 of the datapoints as icons 404 grouped by cluster 402. Each icon 404 represents one or more particular datapoints and is selectable to cause the display of the one or more images 120 associated with the one or more particular datapoints. At block 610, computer system 100 receives a selection of one or more of the icons 404. At block 612, computer system 100 causes the display of the images 120 associated with the one or more particular datapoints represented by the one or more selected icons 404. At block 614, computer system 100 receives a user classification label for at least one of the displayed images. At block 616, computer system 100 predicts classification label(s) for unlabeled images 120 and receives a user response to the predicted classification label(s).

Figure 7:
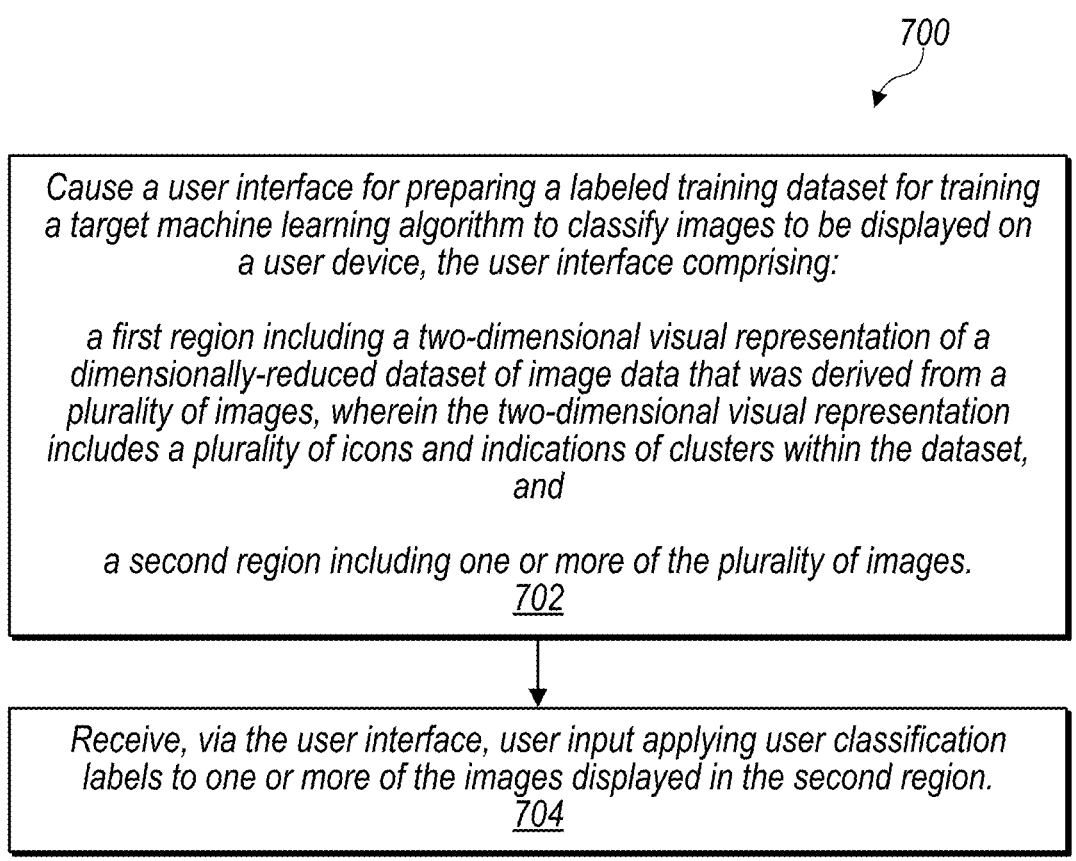
FIG. 7 is flowchart illustrating an embodiment of a training dataset creation method in accordance with various embodiments.

Referring now to FIG. 7, a flowchart illustrating an embodiment of a training dataset creation method 700 is shown. In various embodiments, the various actions associated with method 700 are performed with computer system 100. At block 702, computer system 100 causes a user interface (e.g., GUI 500) for preparing a labeled training dataset 130 for training a target machine learning algorithm to classify images to be displayed on a user device. The user interface includes a first region 510 including a two-dimensional visual representation 400 of a dimensionally-reduced dataset of image data that was derived from a plurality of images 120. The two-dimensional visual representation 400 includes a plurality of icons 404 and indications of clusters 404 within the dataset. The user interface also includes a second region 520 that includes include one or more of the plurality of images 120. At block 704, computer system 100 receives user input applying user classification labels to one or more of the images 120 displayed in the second region 520.

Exemplary Computer System

Figure 8:
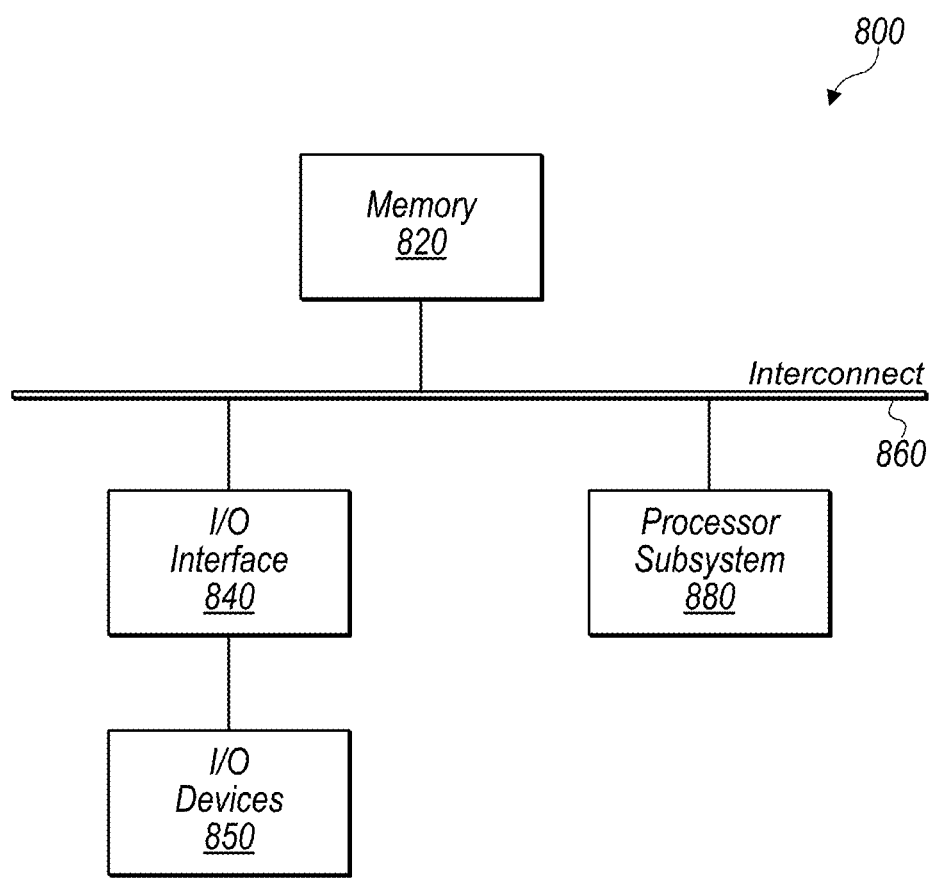
FIG. 8 is a block diagram of an exemplary computer system, which may implement the various components of FIG. 1.

Turning now to FIG. 8, a block diagram of an exemplary computer system 800, which may implement the various components of computer system 100 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    (a) receiving, with a computer system, a dataset of image-derived features for each of a plurality of images, wherein the image-derived features are determined by using a first machine learning algorithm to analyze the plurality of images;
    (b) generating, with the computer system using a dimensionality reduction algorithm, a dimensionally-reduced dataset from the dataset of image-derived features;
    (c) identifying, with the computer system using a clustering algorithm, a plurality of clusters of datapoints within the dimensionally-reduced dataset;
    (d) generating, with the computer system, a visual representation of the datapoints as icons grouped by cluster, wherein each icon represents one or more particular datapoints and is selectable to cause display of one or more of the plurality of images associated with the one or more particular datapoints;
    (e) receiving, at the computer system, a selection of one or more of the icons;
    (f) in response to the selection, causing, with the computer system, display of the images associated with the one or more particular datapoints represented by the one or more selected icons;
    (g) receiving, at the computer system, user classification labels for a first set of images from the plurality of images;
    (h) generating, with the computer system with the dimensionality reduction algorithm and a second machine learning algorithm being distinct and different from the first machine learning algorithm and using the user classification labels for the first set of images, a second dimensionally-reduced dataset from the datasets of image-derived features for a second set of images from the plurality of images, the second set of images including unlabeled images;
    (i) identifying, with the computer system using the clustering algorithm and the second machine learning algorithm, predicted classification labels for at least some of the unlabeled images in the second set of images; and
    (j) receiving, at the computer system, a user response to the predicted classification label for one or more of the unlabeled images.

2. The method of claim 1, wherein the user response is an acceptance of the predicted classification label as a user classification label for the one or more unlabeled images.

3. The method of claim 1, wherein the user response is a rejection of the predicted classification label for the one or more unlabeled images.

4. The method of claim 1, wherein the user response is a command to exclude the one or more unlabeled images from classification.

5. The method of claim 1, further comprising repeating steps (h)-(j) until all of the plurality of images are labeled with a user classification label or excluded from classification.

6. The method of claim 1, further comprising:
    (k) generating, with the computer system, a visual representation of the datapoints within the second dimensionally-reduced dataset as second icons grouped by the predicted classification label, wherein each second icon represents one or more particular datapoints within the second dimensionally-reduced dataset and is selectable to cause display of the second set of images associated with the one or more particular datapoints within the second dimensionally-reduced dataset;
    (l) receiving, at the computer system, a selection of one or more of the second icons; and
    (m) in response to the selection, causing, with the computer system, display of the images associated with the one or more particular datapoints represented by the one or more selected second icons;
    wherein a second user response to the predicted classification label is received in response to the display of the images associated with the one or more particular datapoints represented by the one or more selected second icons.

7. The method of claim 6, wherein the visual representation of the datapoints within the second dimensionally-reduced dataset as second icons grouped by the predicted classification label of step (k) includes a two-dimensional rendering of the second icons grouped by predicted classification label, wherein second icons in the same predicted classification label are shaded with a same color and are positioned close together.

8. The method of claim 1, further comprising:
    (n) causing, with the computer system, display of a user interface including:
        the visual representation of the datapoints as icons grouped by cluster;
        an image gallery of one or more images associated with the one or more particular datapoints represented by the one or more selected icons;

a cluster list including indications of each cluster of datapoints; and a user classification list including indications of each user classification label.

9. The method of claim 8, wherein receiving a user classification label for at least one of the displayed images includes:

causing a menu to be displayed in the user interface, wherein the menu includes indications of each user classification label; and receiving the user classification label by receiving a user selection of the indication corresponding to the user classification label.

10. The method of claim 1, wherein the second machine learning algorithm is an iterative optimization algorithm.

11. The method of claim 8, further comprising:

(o) causing, with the computer system, the user interface to be updated to include:

the visual representation of the datapoints within a second dimensionally-reduced dataset as second icons grouped by predicted classification label;

an image gallery of one or more images associated with the one or more particular datapoints represented by the one or more selected second icons;

a user classification list including indications of each user classification label; and a predicted classification list including indications of each predicted classification label.

12. A non-transitory, computer-readable medium storing instructions that when executed by a computer system cause the computer system to perform operations comprising:

(a) receiving, with the computer system, a dataset of image-derived features for each of a plurality of images, wherein the image-derived features are determined by using a first machine learning algorithm to analyze the plurality of images;

(b) generating, with the computer system using a dimensionality reduction algorithm, a dimensionally-reduced dataset from the dataset of image-derived features;

(c) identifying, with the computer system using a clustering algorithm, a plurality of clusters of datapoints within the dimensionally-reduced dataset;

(d) generating, with the computer system, a visual representation of the datapoints as icons grouped by cluster, wherein each icon represents one or more particular datapoints and is selectable to cause display of one or more of the plurality of images associated with the one or more particular datapoints;

(e) receiving, at the computer system, a selection of one or more of the icons;

(f) in response to the selection, causing, with the computer system, display of the images associated with the one or more particular datapoints represented by the one or more selected icons;

(g) receiving, at the computer system, user classification labels for a first set of images from the plurality of images;

generating, with the computer system with the dimensionality reduction algorithm and a second machine learning algorithm being distinct and different from the first machine learning algorithm and using the user classification labels for the first set of images, a second dimensionally-reduced dataset from the datasets of image-derived features for a second set of images from the plurality of images, the second set of images including unlabeled images;

(i) identifying, with the computer system using the clustering algorithm and the second machine learning algorithm, predicted classification labels for at least some of the unlabeled images in the second set of images; and (j) receiving, at the computer system, a user response to the predicted classification label for one or more of the unlabeled images.

13. The computer-readable medium of claim 12, wherein the plurality of images includes a plurality of multispectral images of cells, a plurality of multimodal images of the cells, or both.

14. The computer-readable medium of claim 12, wherein the plurality of images is randomly selected from a larger pool of images.

15. The computer-readable medium of claim 12, wherein the first machine learning algorithm is a convolutional neural network.

16. The computer-readable medium of claim 12, wherein the plurality of clusters is equal to X times Y clusters, wherein X is the number of groups into which a user wants to classify the images; and Y is greater than or equal to 1.

17. The computer-readable medium of claim 12, wherein the visual representation of the datapoints as icons grouped by cluster of step (d) includes a two-dimensional rendering of the icons grouped by cluster, wherein icons in the same cluster are shaded with a same color and are positioned close together.

18. The computer-readable medium of claim 12, further comprising preparing a labeled training dataset for training a third machine learning algorithm to classify images including labeled images and their respective user classification labels.

* * * * *